Sept. 23, 1941.    A. M. YOUNG    2,256,635
AIRCRAFT AND MEANS FOR STABILIZING THE SAME
Filed Aug. 19, 1939    3 Sheets—Sheet 1
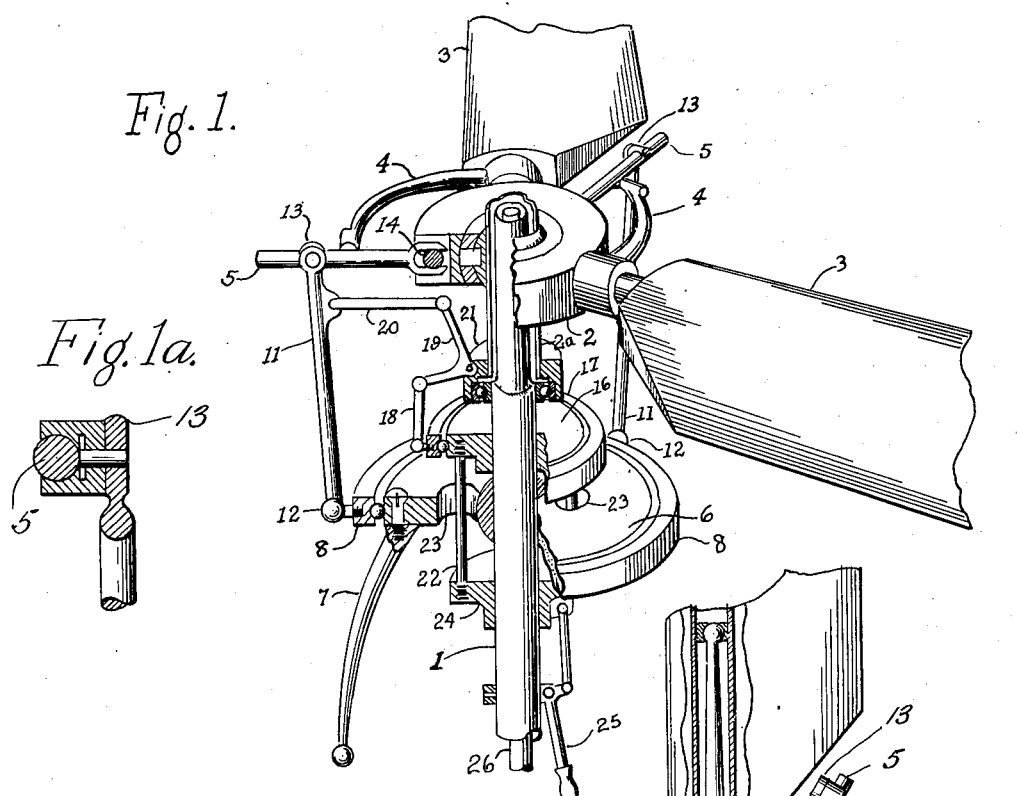
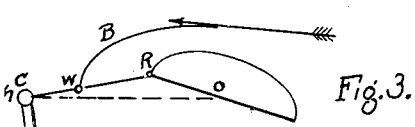
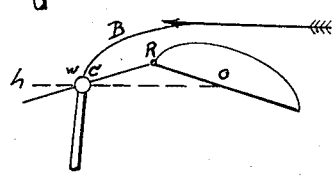
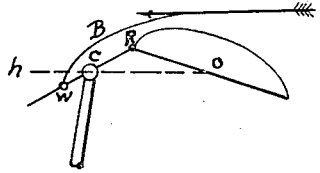
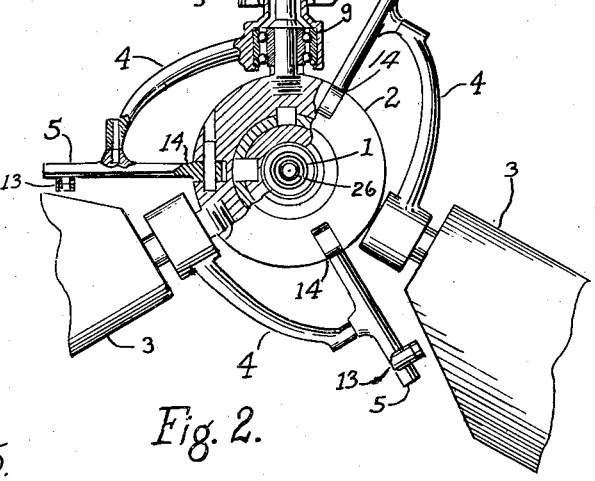
INVENTOR
Arthur M. Young
BY Harry C. Hart
ATTORNEY Sept. 23, 1941.  A. M. YOUNG  2,256,635
AIRCRAFT AND MEANS FOR STABILIZING THE SAME
Filed Aug. 19, 1939  3 Sheets-Sheet 2
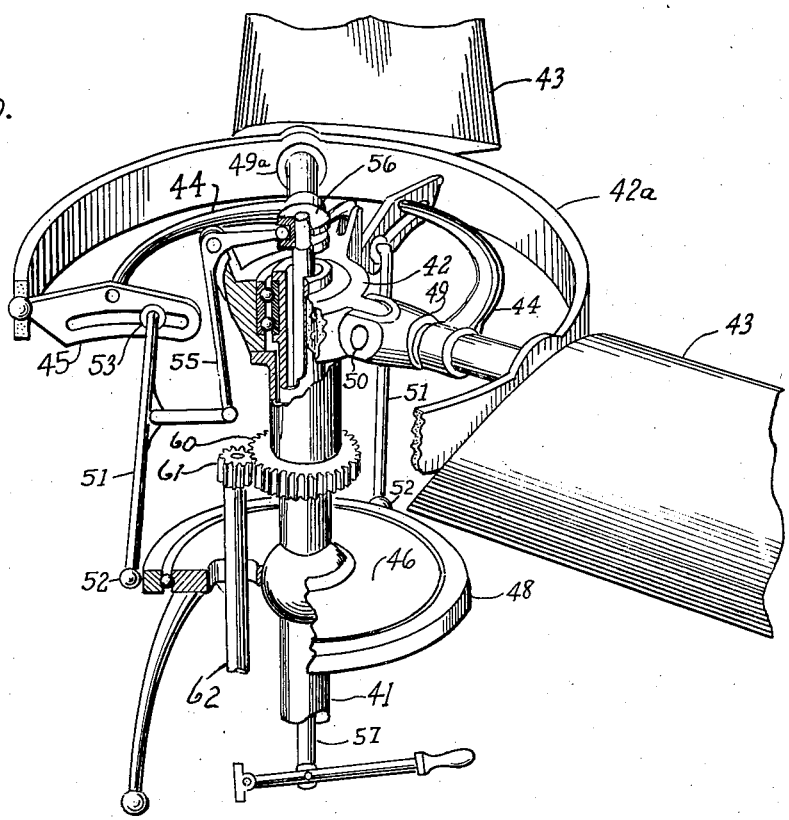
Fig.6.
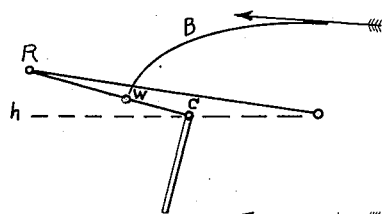
Fig.7.
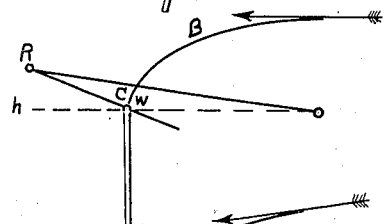
Fig.8.
Fig.9.
INVENTOR
Arthur M. Young
BY Harry C. Hart
ATTORNEY Sept. 23, 1941.    A. M. YOUNG    2,256,635
AIRCRAFT AND MEANS FOR STABILIZING THE SAME
Filed Aug. 19, 1939    3 Sheets-Sheet 3
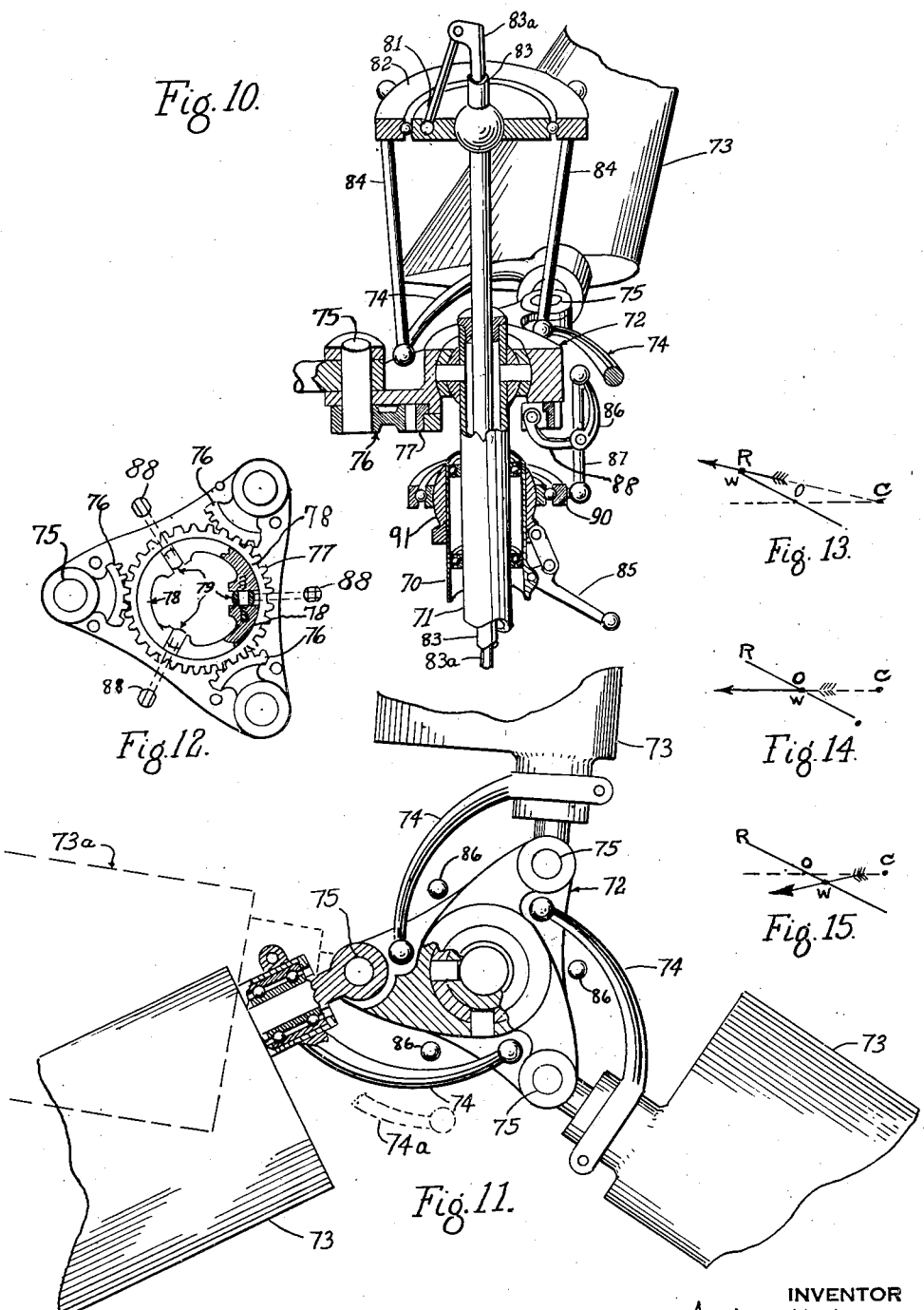
INVENTOR
Arthur M. Young
BY Harry C. Hart
ATTORNEY Patented Sept. 23, 1941

2,256,635

UNITED STATES PATENT OFFICE 2,256,635

AIRCRAFT AND MEANS FOR STABILIZING THE SAME

Arthur M. Young, Paoli, Pa.

Application August 19, 1939, Serial No. 290,987

20 Claims. (Cl. 244—17)

This invention relates to aircraft, and particularly to that type of aircraft, commonly known as helicopter, in which both sustenation and propulsion are derived from an airscrew which rotates in a generally horizontal plane.

The object of the invention is to improve the stability of helicopter under all conditions of operation, including hovering flight, forward flight, taking off and landing.

I have found that the airscrew or rotor of a helicopter is of one or other of two different kinds based on different principles of operation and having entirely different stability characteristics. The first kind is exemplified by a rotor in which a hub is mounted to rotate about an axial spindle fixed to the top of the mast, and the rotor blades are individually hinged to this hub so that they may swing up or down with respect to the plane of rotation. With this construction, assuming the mast to be vertical and the rotor to be turning about it in a horizontal plane, tipping the mast forward, for example, tips the plane of rotation of the hub forward and this in turn decreases the angle of attack of the advancing blade which is momentarily directed to the side of the machine and increases the angle of attack of the opposite retreating blade. This causes the first blade to fall relatively to the original horizontal plane of rotation and the opposite blade to climb relatively to the same plane until the plane of rotation of the rotor is once more perpendicular to the mast, the front and rear blades occupying, respectively, the low point and the high point of this new plane. Because of the fact that the blade incidence angles depend solely on the orientation of the mast and not at all on the rotor plane, the rotor plane itself always tends to remain perpendicular to the mast in still air, and I therefore designate a rotor of this kind a "mast-dependent rotor;" and I designate by the same term rotors of other constructions which exhibit this same property.

The lift vector is vertical when the plane of rotation is horizontal but tips forward when the plane of rotation is tipped forward so that a propulsive force is exerted on the machine, resulting in a forward motion. In forward motion the effective angles of attack of the blades are altered by the relative wind and the amount of tipping of the plane of rotation is reduced.

Machines of this kind are not seriously affected by disturbing gusts of wind. Since the individual blades may swing in a direction perpendicular to the plane of rotation, each blade may adjust its angle of attack and therefore its lift to the wind, which results in their being highly insensitive to such disturbances. However, the mast-dependent rotor is open to the serious objection that it is not inherently stable. This fact is related to the tendency for the plane of rotation to remain perpendicular to the mast. Without definitely subscribing to any particular theory, I believe that the explanation is as follows: When, for example, the machine is hovering, with the lift vector passing through the hub and through the center of gravity of the machine, and due to some slight shifting of weight, or the like, the mast is slightly tipped, the rotor plane tips with it, and the machine immediately starts to travel in the direction of the tip. It may be brought to rest again only by manipulations of the controls.

A rotor of the second kind, which I term a rotation-plane-dependent rotor, is exemplified by a machine in which the blades are attached to the hub without hinges, and the hub itself is mounted through a universal joint on the mast. Because of the universal joint, tipping of the mast has no effect on the plane of rotation of the rotor or the angles of incidence of its blades; rather, the machine hangs by the mast from the rotor like a plumb bob, mast axis and rotor plane being entirely independent. And as I have found in the course of numerous tests, a machine of this kind has neutral stability in still air. However, should a gust of wind strike it, the lift on the blade advancing toward the gust is increased and the blade tends to rise, while the lift on the retreating blade is diminished and the blade tends to fall. This tips the hub itself and since all the blades are rooted in the hub, has the effect of increasing and decreasing the angles of attack of the intermediate blades, as measured from the horizontal, or of keeping the angles to the wind constant, so that the next oncoming blade lifts in the gust still more than its predecessor and the next retreating blade still less. Thus the action is cumulative, and the flapping of the blades or tipping of the rotor is unlimited. In the course of a few revolutions and before the pilot has had an opportunity to manipulate the controls to prevent it, the machine overturns.

Thus the mast-dependent rotor, in which the angle of attack, and therefore lift, of each blade, depends on mast position and not on the position of any other blade, exhibits one kind of instability; whereas the rotation-plane-dependent rotor, in which the angle of attack and therefore lift of each blade depends on the rise of its predecessor blade above the original plane of rotation and the fall of its successor blade below it and not at all on mast position, exhibits instability of a different kind.

A further objection to the rotation-plane-dependent rotor lies in the difficulty of "feathering" the blades to provide propulsive force. The addition of any known feathering mechanism of practical construction to a rotation-plane-dependent rotor immediately converts it to a mast-dependent rotor.

By this invention I obtain improved stability under all conditions of operation, through the provision of a novel rotor in which the desirable features of both the mast-dependent and the rotation-plane-dependent rotor are incorporated, together with manually variable control means for blending these features and varying the extent to which my rotor resembles one or other of the known kinds of rotor in its behavior, while at the same time preserving the usual manual control of feathering. Also I provide means for immediately placing my rotor in a condition in which it is safe from overturning influences while on the ground.

More particularly, the invention consists in the novel construction and combination of parts hereinafter described, illustrated in the accompanying drawings and pointed out in the claims hereto appended; it being understood that various changes in form, proportion, size and minor details of construction within the scope of the claims may be resorted to without departing from the spirit or sacrificing any of the advantages of my invention.

For a clear comprehension of the invention reference is directed to the accompanying drawings which illustrate preferred embodiments thereof, wherein:

Fig. 1 is a view in perspective of a rotor hub and controls embodying my invention in one form;

Fig. 1a is a detail view of a part of the latter.

Fig. 2 is a plan view of the arrangement of Fig. 1;

Figs. 3, 4 and 5 are diagrams illustrating the behavior of the arrangement of Fig. 1 in three different positions;

Fig. 6 is a view in perspective of a rotor hub with blades and controls embodying my invention in another form;

Figs. 7, 8 and 9 are diagrams illustrating the behavior of the arrangement of Fig. 6 in three different positions;

Fig. 10 is a view in perspective of a rotor hub with blades and controls embodying my invention in still another form;

Fig. 11 is a plan view of the hub of Fig. 10 as seen from above;

Fig. 12 is a diagrammatic view of the hub of Fig. 10 as seen from below;

Figs. 13, 14 and 15 are diagrams illustrating the behavior of the arrangement of Fig. 10 in three different positions.

Referring now to Fig. 1, in which for the sake of clarity certain parts have been omitted, and at the same time to Fig. 2, reference character 1 indicates a mast which is fixedly attached to the body of the machine, not shown. At the upper end of the mast a hub 2 is mounted on a universal joint which in turn is mounted on a sleeve 2a for rotation about the mast 1. The hub may therefore not only rotate about the mast but tip or incline with respect to the mast in any direction.

Three blades 3 extend radially from the hub 2 and are mounted in journals 9 in the hub for rotation about their own longitudinal axes. A bracket 4 is fixedly attached to the root of each blade and extends around the hub 2 in each direction where it is pivotally attached to a rod 5.

Below the hub 2 is a control ring 6 mounted on a spherical knob for tipping in any direction about the mast. A handle or control stick 7 depends from this ring 6 to a position conveniently placed with respect to the pilot's seat in the body, not shown. An outer ring 8 is arranged to rotate about the periphery of this control ring 6 in a ball race which maintains the outer ring 8 coplanar with the control ring 6 but permits the former to rotate with the hub 2.

At three points equally spaced about the periphery of the outer ring 8 three link rods 11 are attached by hinges 12 which permit their upper ends 13 to move inward and outward in the plane of the mast 1. The upper ends 13 of these link-rods 11 are slidably attached to the rods 5 and afford supports for the same. Fig. 1a shows in cross section the sliding attachment of upper ends 13 to rods 5. The inner ends of the rods 5 are pivoted in the periphery of the hub 2 at 14 as shown.

Intermediate the hub 2 and the control ring 6 an upper collar 16 is slidably mounted on the mast 1. A ring 17 is arranged to rotate about this collar 16 and bears at three points equally spaced about its periphery three links 18 which connect with three bell cranks 19 which in turn connect with the vertical adjustment rods 11 through links 20 as shown. The bell cranks 19 are pivoted to a collar 21 fixed to the sleeve 2a and therefore rotatable about the mast 1, and the sliding collar 16 is connected by rods 22 which pass through holes 23 in the control ring 6 to a lower sliding collar 24 which may be raised and lowered with respect to the mast 1 by a handle 25 attached as shown. Upward movement of handle 25 thus draws the ends 13 of rods 11 inward along the rods 5.

The means for driving the hub 2 in rotation about the mast 1 may be of any desired kind and may conveniently include a drive shaft 26 which passes axially through the mast and terminates in a pinion arranged to drive an internal ring gear mounted on the hub through idler gears mounted at the top of the mast.

Since the blades are attached to the hub by journals but not by hinges, the hub itself tips with the blades and follows the plane of rotation of the rotor as a whole.

The operation of the arrangement of Fig. 1 will be better understood in connection with the diagrams, Figs. 3, 4 and 5, in which O represents the center of the hub;
R represents the rotor;
B represents the blade bracket 4;
hO represents the horizontal;
C represents the point of attachment of the vertical rod 11 to the horizontal rod 5; and
W represents the point of attachment of the blade bracket 4 to the horizontal rod 5.

Referring to these diagrams, assume that the machine is moving to the left in Fig. 1, the mast being vertical and the plane of rotation of the blades substantially horizontal. If, now, a disturbance should take place which tips the forward blade upward and rear blade downward, the rotor hub will tilt as shown in Figs. 3, 4 and 5. If the adjustments are in the position shown in Fig. 1, the result will be as shown in Fig. 3 in which a tilt of the plane of rotation of the rotor of 10° results in an increase in the angle of incidence of the advancing blade of about 5°. This tends to lift the advancing blade somewhat, so that when it reaches the forward position it is higher than its predecessor. The action is then repeated, with the result that flapping of blades or tipping of rotor plane is increased over what it would be in the case of the mast-dependent rotor, while still not being unlimited flapping of the type which is responsible for the instability of the rotor-plane-dependent rotor.

If the vertical rod 11 is moved inward so that it coincides substantially with the end of the blade bracket 4, as shown in Fig. 4, then a tilt of the rotor of 10° has no effect on the blade angle. But an inclination of the mast away from the vertical by a given amount produces a change in the angles of advancing and retreating blades in the same amount, and the machine becomes one of the mast-dependent type.

If the vertical rod is moved still further inward, as indicated in Fig. 5, then, since the point about which the lever 5 rocks is between the hub end 14 which rises and the bracket end which falls, a tilt of the rotor in the sense shown will produce a change in blade angle in the opposite sense. The purpose and effect of such a decrease of blade incidence angle with increase of rotor plane inclination and vice versa will be described hereinafter.

Obviously, by manipulation of the control stick 7 and consequent inward or outward movement of the vertical rods 11 I may produce feathering of the blades 3 dependent on tipping of the plane of rotation and inclination of the mast in any desired ratio, from a positive ratio through zero to a negative ratio.

In the diagrammatic figures and in much of the above description it has been assumed that the mast remained vertical and that the plane of rotation was tipped out of the horizontal plane. It will be understood that corresponding but different movements take place when the plane of rotation remains horizontal and the mast is tipped out of the vertical.

In the course of forward flight the control ring 6 is normally maintained by the pilot at an angle to the mast so that each blade 3 is feathered in the course of its rotation to produce forward motion of the machine, the angle of attack of an advancing blade being diminished and that of a retreating blade increased. The stabilizing feathering which is dependent on concurrent inclinations of the plane of rotation and the mast takes place entirely independently of and superposed upon this manually controlled feathering.

Fig. 6 shows another embodiment of my invention in which the universally jointed hub of Fig. 1 is replaced by a simple hub 42 mounted for rotation about a mast 41 and to which blades 43 are attached by hinges 50 for rotation-plane tipping or flapping and by journals 49 for feathering. A control ring 46, like that of Fig. 1, operates in the same way both to produce manual feathering and to produce feathering due to tipping of the mast. In Fig. 6, however, the member which follows the plane of rotation of the rotor is a ring 42a provided at three equally spaced points with journals 49a through which the roots of the blades pass. These journals serve to hold the ring 42a in the plane of rotation of the blades. This ring 42a may conveniently be arranged to support the centrifugal forces which come into play when the rotor is rotated rapidly. Three slotted members 45 are pivotally attached to the ring at one point and to the blade brackets 44 at another; and vertical control rods 51, hinged at their lower ends 52 to the outer member 48 of the control ring 46, are provided at their upper ends 53 with pins which work in the slots in the members 45. The control rods 51 are conveniently operated as shown by bell cranks 55 which engage with a collar 56 at the upper end of a control shaft 57 which extends downward through the mast 41 and terminates in a handle 57a. The hub 42 is driven through gears 60 and 61 by a drive shaft 62.

In the diagrams, Figs. 7, 8 and 9, the reference characters have the same significance as before; and the operation is the same for all purposes, including manual feathering, blended feathering and adjustment as that of the arrangement of Fig. 1.

Figs. 10 and 11 show a third arrangement in accordance with my invention. In these figures the hub 72 is universally mounted on a shaft 71 arranged to rotate in a hollow mast 70 and the blades are journalled to the hub 72; but in place of the variable ratio lever systems of Figs. 1 and 6, the blades 73 are attached to the hub 72 by vertical hinge pins 75 so that each blade may swing forward or backward of the radius through its hinge. It may be brought to any desired position by regulation of engine torque, for example, by throttle adjustment, and held there by an arrangement such as that of Fig. 12. In this figure, segmental gears 76, fixed to the blade hinge pins 75 mesh with a common ring gear 77. These gears serve to maintain equal spacings between the blades 73. The ring gear 77 may be locked in position by a brake band which consists of three shoes 78, expanded by turn buckles 79. These turn buckles 79 are tightened by drawing up their arms 88 through links 86, 87 attached to the outer race of a ball bearing 90, rockably mounted on a spherical seat 91 which in turn is slidable on the mast 70 by a toggle and lever 85.

In this arrangement the control ring 81, 82 is rockably mounted on a control tube 83 above the hub 73, and rod 84 extends therefrom to the wing brackets 74. It may be tipped in any direction for feathering by raising, lowering and turning the control rod 83a.

Like changes in the angles of attack of all the blades (pitch changes), may be effected by sliding the control tube 83 axially of the mast 70. This raises and lowers the control ring 81, 82 as a whole with respect to the hub 72, and thus changes the blade angles together. Similar mechanisms may be provided in the arrangements of Figs. 1 and 6 to effect pitch changes, though in order to avoid undue complexity of the drawings they have not been shown.

Referring to Figs. 13, 14 and 15, in which the same consecutive arrangement has been adopted as in Figs. 3, 4 and 5, it will be observed that when each blade lies directly along a radius of the hub 72, (Fig. 14) tipping of the hub causes no change in blade angles. Fig. 13 illustrates the stable condition in which the blade lags behind the radial position. In this case the projection of the blade axis is at the point W and rotor tipping induces blade feathering in the same direction but in a smaller amount.

Fig. 15 illustrates the condition in which each blade leads the hub. In this condition the projection of the blade axis W lies between the center of the hub O and the control point C and rotor tipping induces blade feathering in the opposite direction. The purpose and effect of such reversed feathering will be more fully described hereinafter.

I have found by experiment that a helicopter equipped with a rotor provided with blended control as above described operates satisfactorily under widely different conditions. It hovers easily in still air, not tending to move out of place; and when struck by a gust of wind, it does not overturn but merely tilts a small amount and then travels with the wind. Correspondingly, when the maneuvering controls are applied, it moves easily and rapidly in the desired direction.

It will be understood that all the arrangements which I have shown are essentially equivalent to one another in their main features. That is to say, they all result in a blending of the effects of mast tipping and tipping of the plane of rotation, which blend can be manually adjusted. The three hub forms shown are not necessarily exclusive and my invention is equally applicable to other constructions which embody its essential features.

Though I have described my rotor in terms of a single three-blade rotor to be driven by an engine, it is equally adapted to rotors of any number of blades, and likewise to machines having a plurality of rotors, mounted coaxially or side by side and rotating in either direction, whether driven by an engine or in autorotation.

Referring now to the arrangement of Fig. 1, and to the disposition in which increase of rotor plane inclination produces decrease of blade incidence angle as illustrated in Fig. 5, under these conditions the performance of my rotor is no longer a blend of mast-dependent and rotation-plane-dependent rotor performances. Rather, it is a "self-flattening" or "flat-tracking" rotor, since any tendency of the plane of rotation to tip upward is followed by a decrease in the angle of incidence of the advancing blade which immediately counteracts this tendency.

Rotors of this "flat-tracking" characteristic are known but they have not been generally adopted. I believe the reason for this is that such a rotor is inherently unstable in vertical flight and while hovering. However, I have discovered that it is of advantage under certain special conditions, particularly at the time of taking off from the ground or landing. At such times, the body of the machine is resting on the ground and is at the mercy of gusts or of any winds which the operator may not have anticipated. The effect of such gusts in the case of my stable rotor is to incline the plane of rotation away from the wind which "gets under" the rotor and tends to overturn the machine unless the operator quickly makes the proper feathering adjustment to bring the plane back to the horizontal. But with flapping automatically inhibited as in the case of a "flat-tracking" rotor the plane of rotation remains almost flat in a gust of wind and there is no upsetting couple.

Again, when the rotor is first started or is just coming to rest and therefore turning slowly, a light wind produces a relatively large difference in wind velocities on advancing and retreating blades. This tends to produce a flapping which may be in such a great amount as to injure the joints of the mechanism. But with the controls of my invention in "flat-tracking" position the amount of flapping remains small even when the rotation is very slow.

Thus the requirements for a rotor which shall be stable in flight and one which shall not overturn on the ground are very different. It has been suggested in the past that the pitch of all blades might be reduced to zero or a negative value when the machine is on the ground. However, before taking off, the pitch must of course be given the positive value, whereupon the difficulties and dangers above enumerated may develop.

With the present invention the pitch of the blades may be great enough to lift the machine from the ground even when the controls are in flat-tracking position; and they may be left in flat-tracking position until the machine is well off the ground, since hovering instability does not usually develop until ascension has ceased. After the machine has reached a safe distance above ground, for example half its rotor diameter, the controls may be shifted to the blending or stable position and flight continued.

If desired, an auxiliary mechanism may be supplied which automatically shifts the controls to flat-tracking position when the weight of the machine is resting on its wheels; and a time delay relay operated by compressed air, or the like, may be interposed to hold them in flat-tracking position until a second or so after taking off.

The shift to the flat-tracking condition is accomplished with the arrangement of Fig. 6 in a manner similar to that described in connection with Fig. 1. In Fig. 10 it is accomplished by swinging the blades ahead of their radii, as indicated by the dotted lines showing the blade in the position 73a and its wing bracket in the position 74a.

Thus by this invention I have not only provided a rotor of improved stability under all conditions of flight and one in which the blending of mast control of feathering with rotor plane control of feathering is adjustable, but I have in addition provided a system for quickly and simply converting my rotor into a "flat-tracking" rotor to prevent overturning on the ground.

In the specification and claims the term "rotor plane" is used. This may be defined as the plane determined by corresponding points in any three blades of the rotor, such as the blade tips. This definition avoids the difficulties involved in defining the rotor plane as that swept through by the blades, for if there is coning in the blades the figure defined is not strictly a plane, but a shallow inverted cone. Similarly the term "inclination of the rotor plane around the axis to a given blade" is not strictly accurate when there is coning, because the axis indicated by the definition is perpendicular to the mast, whereas the blade indicated has a slight angle with the perpendicular to the mast due to coning. Therefore in this case the axis of a given blade must be interpreted as "the axis perpendicular to the mast and immediately under a given blade."

I claim:

1. In an aircraft, a bladed rotor, a rotor support, means for mounting said rotor for rotation on said support and for universal inclination of the plane of the rotor relative to the rotor support, and means for adjusting the aerodynamic incidence of the blades individually including means for controlling the aerodynamic incidence of a given blade by the change in inclination of the blade ahead of it relative to the rotor support.

2. In an aircraft, a bladed rotor, a rotor support, means for mounting said rotor for rotation on said support and for universal inclination of the plane of the rotor relative to the rotor support, means for adjusting the aerodynamic incidence of the blades individually including means for controlling the aerodynamic incidence of a given blade by the change in inclination of the blade ahead of it relative to the rotor support, and pilot controlled means for superimposing additional change of incidence at the will of the pilot for maneuvering the machine.

3. In an aircraft, a bladed rotor, a rotor support, means for mounting said rotor for rotation on said support and for universal inclination of the plane of the rotor relative to the rotor support, and means for adjusting the aerodynamic incidence of the blades individually including means for controlling the aerodynamic incidence of a given blade by the change in inclination of the blade ahead of it relative to the rotor support, said change to be in the same sense but smaller in magnitude than the angular magnitude of the said inclination.

4. In an aircraft, a bladed rotor, a rotor support, means for mounting said rotor for rotation on said support and for universal inclination of the plane of the rotor relative to the rotor support, means for adjusting the aerodynamic incidence of the blades individually including means for controlling the aerodynamic incidence of a given blade by the change in inclination of the blade ahead of it relative to the rotor support, said change to be in the same sense but smaller in magnitude than the angular magnitude of the said inclination, and pilot controlled means for superimposing additional change of incidence at the will of the pilot for maneuvering the machine.

5. In an aircraft, a bladed rotor, a rotor support, means for mounting said rotor for rotation on said support and for universal inclination of the plane of the rotor relative to the rotor support, means for adjusting the aerodynamic incidence of the blades individually including means for controlling the aerodynamic incidence of a given blade by the change in inclination of the blade ahead of it relative to the rotor support, said change to be in the same sense but smaller in magnitude than the angular magnitude of the said inclination, pilot controlled means for superimposing additional change of angle of attack at the will of the pilot for maneuvering the machine, and pilot controlled means for reversing the direction of angle of attack produced by said inclination.

6. In an aircraft having a substantially upright support, a hub, means for mounting said hub on said support for rotation about the support, generally radial blades secured to said hub, said mounting means including universal pivot means whereby the plane of rotation of the blades is inclinable relative to the support, means for mounting the blades on the hub for rotation about axes extending respectively longitudinally of the blades, means for controlling the angle of a given blade with respect to the upright support by the departure of the rotor plane from perpendicularity with the said support at a point 90° ahead of the given blade, and pilot controlled means for superimposing additional change of angle at the will of the pilot for maneuvering the machine.

7. In an aircraft, a substantially upright support, a hub, means for mounting said hub on said support for rotation about the support, generally radial blades secured to said hub, said mounting means including universal pivot means whereby the plane of rotation of the blades is inclinable relative to the support, means for mounting the blades on the hub so that the aerodynamic incidence of the entire blade or part may be varied, means for controlling the aerodynamic incidence of a given blade with respect to the upright support by the departure of the rotor plane from perpendicularity with the said support at a point 90° ahead of the given blade, and pilot controlled means for superimposing additional change of incidence at the will of the pilot for maneuvering the machine.

8. In an aircraft, a substantially upright support, a hub, means for mounting said hub on said support for rotation about the support, generally radial blades secured to said hub, said mounting means including universal pivot means whereby the plane of rotation of the blades is inclinable relative to the support, means for mounting the blades in the hub for rotation about axes extending longitudinally of the blades, means for controlling the angle of attack of a given blade by the departure of the rotor plane from perpendicularity with the mast at a point 90° ahead of the given blade, pilot controlled means for superimposing additional change of angle of attack at the will of the pilot for maneuvering the machine, and pilot controlled means for reversing the direction of angle of attack produced by departure of the rotor plane from perpendicularity with the mast.

9. In an aircraft, a substantially upright support, a hub, means for mounting said hub on said support for rotation about the support, generally radial blades secured to said hub, said mounting means including universal pivot means whereby the plane of rotation of the blades is inclinable relative to the support, means for mounting the blades in the hub so that the aerodynamic incidence of the entire blade or part may be varied, mean for controlling the aerodynamic incidence of a given blade by the departure of the rotor plane from perpendicularity with the mast at a point 90° ahead of the given blade, pilot controlled means for superimposing additional change of incidence at the will of the pilot for maneuvering the machine, and pilot controlled means for reversing the direction of change of incidence produced by departure of the rotor plane from perpendicularity with the mast.

10. In an aircraft, a substantially upright support, a hub, means for mounting said hub on said support for rotation about the support, generally radial blades secured to said hub, said mounting means including universal pivot means whereby the plane of rotation of the blades is inclinable relative to the support, means for mounting the blades in the hub for rotation about axes extending longitudinally of the blades, a member regulated in position by the rotor, a control member mounted concentric with the mast and inclinable at the will of the pilot, members engaging the blades for changing their angle of attack, and linking members to which the above members are connected so that their motion is interdependent, all so constructed and arranged that the angle of attack of a given blade is controlled by the departure of the rotor plane from perpendicularity with the mast at a point 90° ahead of the given blade.

11. In an aircraft, a substantially upright support, a hub, means for mounting said hub on the support for rotation about the support, generally radial blades secured to said hub, said mounting means including universal pivot means whereby the plane of rotation of the blades is inclinable relative to the support, means for mounting the blades on the hub for rotation about axes extending longitudinally of the blades, a member regulated in position by the rotor, a control member mounted concentric with the mast and inclinable at the will of the pilot, members engaging the blades for changing their angle of attack, linking members to which the above members are pivoted at separate points so that their motion is interdependent, and means for shifting the point of pivotation of one of said points with respect to the other two, all so constructed and arranged that the angle of attack of a given blade is controlled by the departure of the rotor plane from perpendicularity with the mast at a point 90° ahead of the given blade, said control being reversible from the arrangement which provides reduced flapping while the machine is on the ground to that which provides increased flapping while the machine is in flight.

12. In an aircraft, a substantially upright support, a bladed rotor including a hub, means for mounting said hub on said support for rotation about said support and including means for mounting said hub for universal inclination, means journalling the blades in said hub for rotation about longitudinally extending axes and so placed that the said axes of the blades are parallel to, but offset from, the radii of said hub, a member mounted in concentricity with the axes of rotation of the rotor, and linkages connecting said member with the blades for controlling their angles of incidence, all so constructed and arranged that the angle of a given blade with respect to the upright support is regulated by the departure from perpendicularity with the said support of the rotor plane at a point 90° ahead of said blade.

13. In an aircraft, a substantially upright support, a bladed rotor including a hub, means for mounting said hub on said support for rotation about said support and including means for mounting said hub for universal inclination with respect to the axis of rotation, means journalling the blades in said hub for rotation about longitudinally extending axes so mounted that the projection of said axes inwardly avoids the neutral point of the universally jointed hub by a distance at least 1% of the blade length, a member mounted in concentricity with the axis of rotation of the rotor, and linkages connecting said pilot operated member with the blades for controlling their angles of incidence, all so constructed and arranged that the angle of a given blade with respect to the support is regulated by the departure from perpendicularity with the said support of the rotor plane at a point 90° ahead of said blade.

14. In an aircraft, a substantially upright support, a bladed rotor including a hub, means for mounting said hub on said support for rotation about said support and including means for mounting said hub for universal inclination with respect to the support, yokes hinged on said hub in a manner permitting lag or advance in the plane of rotation of the hub, means journalling the blades on said yokes for rotation about longitudinally extending axes, means constraining said yokes to undergo corresponding changes in lag or advance, means for locking said yokes at different positions, and pilot controlled means for feathering the rotor blades.

15. In an aircraft, a substantially upright support, a bladed rotor including a hub, means mounting said hub on said support for rotation about said support and including means for mounting said hub for universal inclination with respect to the support, yokes hinged on said hub in a manner permitting lag or advance in the plane of rotation of the hub, means journalling the blades on said yokes for rotation about longitudinally extending axes, means constraining said yokes to undergo corresponding changes in lag or advance, means for locking said yokes at different positions, pilot operated means mounted on the support, and links connecting said pilot operated means with projections at the blade roots for pilot control of blade angles.

16. In an aircraft, a substantially upright support, a bladed rotor including a hub, means mounting said hub on said support for rotation about said support and including means for mounting said hub for universal inclination with respect to the support, yokes hinged on said hub in a manner permitting lag or advance in the plane of rotation of the hub, means journalling the blades on said yokes for rotation about longitudinally extending axes, means constraining said yokes to undergo corresponding changes in lag or advance, means for locking said yokes at different positions, pilot operated means mounted on the support, and links connecting said pilot operated means with projections at the blade roots for pilot control of blade angles, all so constructed that the blades may be locked in a position ahead of a radius passing through the hinge points of their yokes when on the ground, or in a position behind said radius when in flight.

17. In an aircraft, a substantially upright support, a hub, means mounting said hub on said support for rotation about said support, yokes hinged on said hub on an axis generally parallel to the axis of rotation, blades mounted on said yokes, and means constraining said yokes to undergo corresponding amounts of change in lag or advance.

18. In an aircraft, a substantially upright support, a hub, means mounting said hub on said support for rotation about said support, yokes hinged on said hub on an axis generally parallel to the axis of rotation, blades mounted on said yokes, means constraining said yokes to undergo corresponding amounts of change in lag or advance, and pilot operated means for locking said yokes at various settings of lag or advance.

19. In an aircraft, a substantially upright support, a rotor hub mounted for rotation about said support, radially disposed blades, means for mounting said blades on said hub for inclination with respect to the support including means for mounting said blades for rotation about axes extending longitudinally of the blades, extensions on the blades for turning them about said axes, pilot operated means mounted on the support, means positioned by the inclination of the blades relative to the support, levers connected to said last mentioned means, the said levers being also connected at one point to the said blade extensions, and at another point to the said pilot operated means.

20. The combination according to claim 19 wherein means is provided for shifting the relative position of the attachment of said blade extensions and the attachment of the said pilot operated means.

ARTHUR M. YOUNG.